United States Patent
Zhang

(10) Patent No.: US 11,971,840 B2
(45) Date of Patent: Apr. 30, 2024

(54) ONE-TO-MANY COMMUNICATION CIRCUIT

(71) Applicants: Inventec (Pudong) Technology Corporation, Shanghai (CN); INVENTEC CORPORATION, Taipei (TW)

(72) Inventor: You Zhang, Shanghai (CN)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 17/950,136

(22) Filed: Sep. 22, 2022

(65) Prior Publication Data
US 2024/0078207 A1    Mar. 7, 2024

(30) Foreign Application Priority Data
Sep. 7, 2022 (CN) .......................... 202211090558.4

(51) Int. Cl.
*G06F 13/42* (2006.01)

(52) U.S. Cl.
CPC .. *G06F 13/4282* (2013.01); *G06F 2213/0002* (2013.01)

(58) Field of Classification Search
None
See application file for complete search history.

(56) References Cited

U.S. PATENT DOCUMENTS

2023/0244232 A1* 8/2023 Maust ............... H04B 7/18504
                                                              701/2

OTHER PUBLICATIONS

Ping Ran, Baoqiang Wang and Wei Wang, "The design of communication convertor based on CAN bus," 2008 IEEE International Conference on Industrial Technology, Chengdu, 2008, pp. 1-5, doi: 10.1109/ICIT.2008.4608607. (Year: 2008).*

* cited by examiner

*Primary Examiner* — Farley Abad
*Assistant Examiner* — Dayton Lewis-Taylor
(74) *Attorney, Agent, or Firm* — IPRTOP LLC

(57) ABSTRACT

A one-to-many communication circuit includes a recommended standard 232 signal transceiver, a main controller area network transceiver, and a plurality of subordinate controller area network transceivers. The recommended standard 232 signal transceiver is used to receive a control signal from a main controller and convert the control signal into a first signal conforming to the recommended standard 232 communication protocol. The main controller area network transceiver is used to convert the first signal into a second signal conforming to the controller area network communication protocol. And each of the plurality of subordinate controller area network transceivers is used to convert the second signal into a third signal conforming to the recommended standard 232 communication protocol. The one-to-many communication circuit of the present disclosure can realize one-to-many communication of the recommended standard 232, and the present disclosure is based on hardware connection, thus cutting down the programming workload.

10 Claims, 2 Drawing Sheets

ONE-TO-MANY COMMUNICATION CIRCUIT

FIELD OF TECHNOLOGY

The present disclosure relates to the field of communication circuits, in particular, to a communication circuit of the recommended standard 232.

BACKGROUND

The recommended standard 232 (RS-232) is a commonly used standard communication interface which was jointly developed by the American Electronics Industry Association (EIA) in conjunction with Bell System Company, demodulator manufacturers, and computer manufacturers in the 1970s. And the RS-232 is a general serial communication interface. However, the traditional recommended standard 232 only allows one-to-one communication.

SUMMARY

The present disclosure provides a one-to-many communication circuit.

The one-to-many communication circuit according to an embodiment of the present disclosure includes a recommended standard 232 signal transceiver, a main controller area network transceiver, and a plurality of subordinate controller area network transceivers. The recommended standard 232 signal transceiver is used to receive a control signal from a main controller and convert the control signal into a first signal conforming to the recommended standard 232 communication protocol. The main controller area network transceiver is used to convert the first signal into a second signal conforming to the controller area network communication protocol. Each of the plurality of subordinate controller area network transceivers is used to convert the second signal into a third signal conforming to the recommended standard 232 communication protocol.

In one embodiment, the one-to-many communication circuit further includes a resistor, a filter, and a set of electrostatic protection diodes, where the resistor and the filter are sequentially arranged between the main controller area network transceiver and the plurality of subordinate controller area network transceivers, and one side of the set of electrostatic protection diodes is connected to the filter and the other side of the set of electrostatic protection diodes is grounded.

In one embodiment, the main controller area network transceiver includes a first high-potential pin and a first low-potential pin, and each of the plurality of subordinate controller area network transceivers includes a second high-potential pin and a second low-potential pin, where the first high-potential pin and the first low-potential pin are respectively connected to the two ends of the resistor and connected to the two input terminals of the filter respectively, and the two output terminals of the filter are respectively connected to the second high-potential pin and the second low-potential pin.

In one embodiment, the filter has a part number of ACT45B.

In one embodiment, the set of electrostatic protection diodes is included in an electrostatic protection assembly with a part number of PSM712.

In one embodiment, the one-to-many communication circuit further includes a main controller electrically connected to the recommended standard 232 signal transceiver, where the control signal conforms to a universal synchronous or asynchronous receiver transmitter communication protocol.

In one embodiment, the one-to-many communication circuit further includes a plurality of subordinate controllers, electrically connected to the subordinate controller area network transceiver respectively, where each of the plurality of subordinate controllers converts the third signal into a fourth signal conforming to the universal synchronous or asynchronous receiver transmitter communication protocol.

In one embodiment, the number of the plurality of subordinate controller area network transceivers is less than or equal to 110.

In one embodiment, at least one of the main controller area network transceiver and the plurality of subordinate controller area network transceivers is a chip with a part number of SN65HVD230.

In one embodiment, the main controller is electrically connected to the recommended standard 232 signal transceiver, and the main controller is a chip with a part number of MAX3232ESE.

The present disclosure can realize one-to-many communication of the recommended standard 232 through the above structure, and the present disclosure is based on hardware connection, thus cutting down the programming workload.

Figure 1:
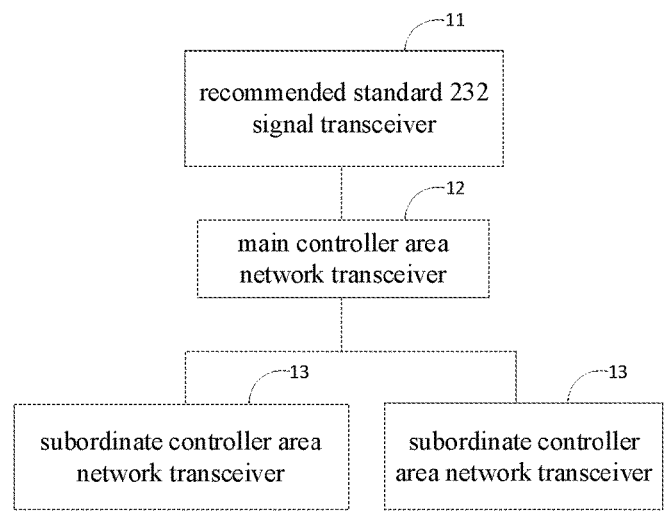
FIG. 1 shows a function block diagram of a one-to-many communication circuit according to an embodiment of the present disclosure.

REFERENCE NUMERALS 1, 1'—one-to-many communication circuit
11—recommended standard 232 signal transceiver
12—main controller area network transceiver
13—subordinate controller area network transceiver
14—main controller
15—subordinate controller
21—first endpoint
22—second endpoint
23—resistor
24—filter
25—electrostatic protection diode
26—third endpoint
27—fourth endpoint.

DETAILED DESCRIPTION

The embodiments of the present disclosure will be described below through specific examples. Those skilled in the art can easily understand other advantages and effects of the present disclosure according to the contents disclosed by the specification. The present disclosure may also be implemented or applied through other different specific implementation modes. Various modifications or changes may be made to all details in the specification based on different points of view and applications without departing from the spirit of the present disclosure. It is to be noted that the following embodiments and the features in the embodiments can be combined with each other without conflict.

In addition, it should be understood that the drawings provided in the following embodiments are only used to illustrate the basic idea of the present disclosure in a schematic way, therefore, only the components related to the present disclosure are shown in the drawings. The drawings are not drawn according to the number, shape and size of the components in actual implementation. The type, number and proportion of each component can be arbitrarily changed in actual implementation, and the layout of the components may be more complicated.

FIG. 1 shows a schematic block diagram of a one-to-many communication circuit according to an embodiment of the present disclosure. As shown in FIG. 1, the one-to-many communication circuit 1 includes a recommended standard 232 signal transceiver 11, a main controller area network transceiver 12, and a plurality of subordinate controller area network transceivers 13, where the main controller area network transceiver 12 is electrically connected to the recommended standard 232 signal transceiver 11 and the plurality of subordinate controller area network transceivers 13.

The recommended standard 232 signal transceiver 11 may be, for example, an integrated circuit. The recommended standard 232 signal transceiver 11 is used to receive a control signal from a main controller and convert the control signal into a first signal conforming to the recommended standard 232 communication protocol.

The main controller area network transceiver 12 may be, for example, an integrated circuit. The main controller area network transceiver 12 is used to convert the first signal into a second signal conforming to the controller area network communication protocol.

Each of the plurality of subordinate controller area network transceivers 13 may be, for example, an integrated circuit, and is used to convert the second signal into a third signal conforming to the recommended standard 232 communication protocol.

In one embodiment, at least one of the main controller area network transceiver 12 and the subordinate controller area network transceiver 13 may be a chip with a part number of SN65HVD230.

Figure 2:
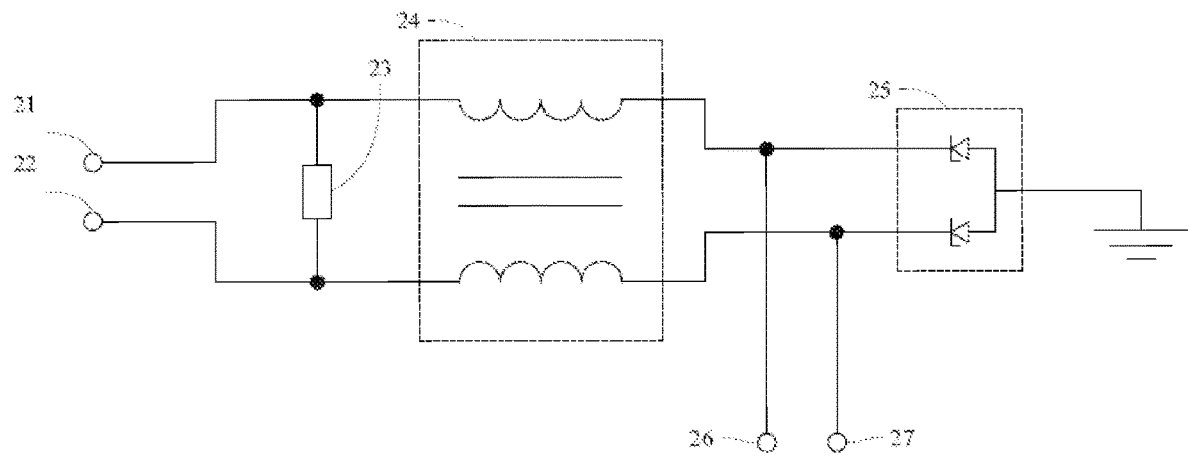
FIG. 2 shows a schematic diagram of a connection circuit between a main controller area network transceiver and a plurality of subordinate controller area network transceivers in the one-to-many communication circuit according to an embodiment of the present disclosure.

FIG. 2 shows a schematic diagram of a connection circuit between a main controller area network transceiver and a plurality of subordinate controller area network transceivers in the one-to-many communication circuit according to an embodiment of the present disclosure. The connection circuit includes a first endpoint 21, a second endpoint 22, a third endpoint 26, and a fourth endpoint 27, and further includes a resistor 23, a filter 24, and a set of electrostatic protection diodes 25. The connection circuit is electrically connected to the main controller area network transceiver 12 through the first endpoint 21 and the second end point 22, and connected to the plurality of subordinate controller area network transceivers 13 through the third end point 26 and the fourth end point 27. The resistor 23, the filter 24 and the set of electrostatic protection diodes 25 are sequentially arranged between the main controller area network transceiver 12 and the plurality of subordinate controller area network transceivers 13, where one side of the set of electrostatic protection diodes 25 is connected to the filter 24 and the other side is grounded. The set of electrostatic protection diodes 25 may include two transient voltage suppression diodes.

In one embodiment, the main controller area network transceiver 12 contains a first high-potential pin and a first low-potential pin, and each of the plurality of subordinate controller area network transceivers 13 contains a second high-potential pin and a second low-potential pin, where the first high-potential pin and the first low-potential pin are respectively connected to the first endpoint 21 and the second endpoint 22 of the resistor 23 to connect with the two input terminals of the filter 24 respectively, and the two output terminals of the filter 24 are respectively connected to the second high-potential pin and the second low-potential pin via the third endpoint 26 and the fourth endpoint 27. The resistor 23 and the filter 24 form a filter circuit to reduce the output noise of the main area network transceiver at a high frequency. The set of electrostatic protection diodes 25 prevents instantaneous high voltage or high pulse from damaging the circuit.

In one embodiment, the second high-potential pins of the plurality of subordinate controller area network transceivers 13 may be electrically connected to the third endpoint 26 in parallel, and the second low-potential pins of the plurality of subordinate controller area network transceivers 13 may be electrically connected to the fourth endpoint 27 in parallel.

In one embodiment, the filter 24 may be a filter with a part number of ACT45B. In one embodiment, the electrostatic protection diodes 25 may be included in an electrostatic protection assembly with a part number of PSM712.

Figure 3:
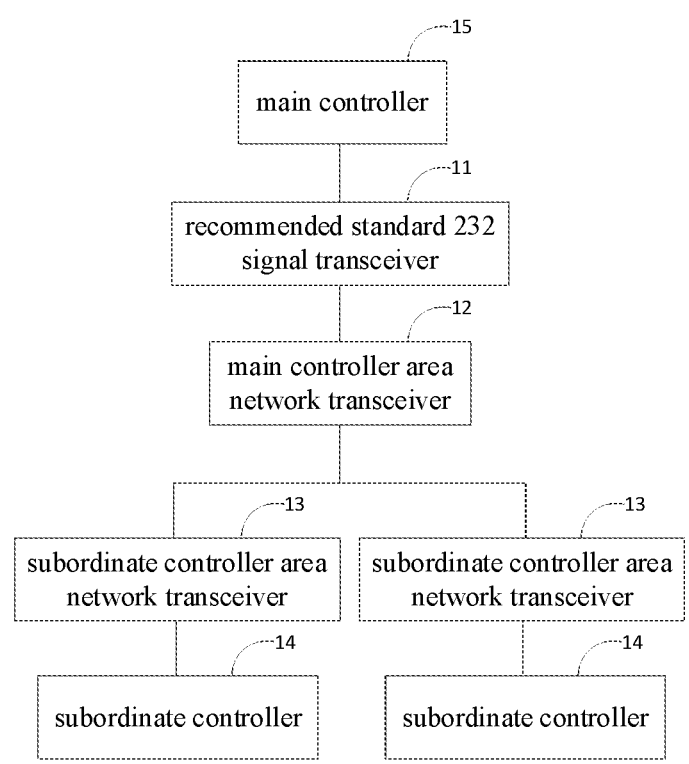
FIG. 3 shows a function block diagram of a one-to-many communication circuit according to another embodiment of the present disclosure.

FIG. 3 shows a schematic block diagram of a one-to-many communication circuit according to another embodiment of the present disclosure. Compared to the one-to-many communication circuit 1 shown in FIG. 1, the one-to-many communication circuit 1' shown in FIG. 3 includes a plurality of subordinate controllers 14 and a main controller 15.

Each of the plurality of subordinate controllers 14 may be a microcontroller or a programmable logic controller. And each of the plurality of subordinate controllers 14 is electrically connected to the subordinate controller area network transceiver 13 respectively, and converts the third signal into a fourth signal conforming to the universal synchronous or asynchronous receiver transmitter communication protocol (USART).

The main controller 15 may be a microcontroller or a programmable logic controller, and is connected to the recommended standard 232 signal transceiver 11 to transmit the control signal conforming to the universal synchronous or asynchronous receiver transmitter communication protocol to the recommended standard 232 signal transceiver 11.

In one embodiment, the main controller 15 may be a chip with a part number of MAX3232ESE.

In one embodiment, the number of the plurality of subordinate controller area network transceivers 13 is less than or equal to 110 in the one-to-many communication circuit to ensure the stability of the controller area network communication.

The one-to-many communication circuit of the present disclosure realizes one-to-many communication of the recommended standard 232, and cuts down software development workload through the hardware conversion as described above. In addition, the one-to-many communication circuit of the present disclosure can be applied to automotive electronic production lines or other production lines, and can give instructions to multiple devices under test (DUT) quickly, thus greatly improving the production efficiency of the production line.

Although the present disclosure has been disclosed with reference to the foregoing embodiments, it should not be understood as a limitation of the present disclosure. Those skilled in the art may make modifications and changes without departing from the spirit and scope of the present disclosure. And the protection scope of the present disclosure shall be subject to the definition of the claim attached to this specification.

What is claimed is:

1. A one-to-many communication circuit, comprising:
   a recommended standard 232 signal transceiver, used to receive a control signal from a main controller and convert the control signal into a first signal conforming to a recommended standard 232 communication protocol;
   a main controller area network transceiver, electrically connected to the recommended standard 232 signal transceiver and used to convert the first signal into a second signal conforming to a controller area network communication protocol; and
   a plurality of subordinate controller area network transceivers, electrically connected to the main controller area network transceiver and receiving the second signal, wherein the main controller area network transceiver sends the second signal to each of the plurality of subordinate controller area network transceivers, and each of the plurality of subordinate controller area network transceivers is used to convert the second signal into a third signal conforming to the recommended standard 232 communication protocol.

2. The one-to-many communication circuit according to claim 1, further comprising a resistor, a filter, and a set of electrostatic protection diodes, wherein the resistor and the filter are sequentially arranged between the main controller area network transceiver and the plurality of subordinate controller area network transceivers, and one side of the set of electrostatic protection diodes is connected to the filter and the other side of the set of electrostatic protection diodes is grounded.

3. The one-to-many communication circuit according to claim 2, wherein the main controller area network transceiver includes a first high-potential pin and a first low-potential pin, and each of the plurality of subordinate controller area network transceivers includes a second high-potential pin and a second low-potential pin, wherein the first high-potential pin and the first low-potential pin are respectively connected to the two ends of the resistor and connected to the two input terminals of the filter respectively, and the two output terminals of the filter are respectively connected to the second high-potential pin and the second low-potential pin.

4. The one-to-many communication circuit according to claim 2, wherein the filter has a part number of ACT45B.

5. The one-to-many communication circuit according to claim 2, wherein the set of electrostatic protection diodes is included in an electrostatic protection assembly with a part number of PSM712.

6. The one-to-many communication circuit according to claim 1, further comprising a main controller electrically connected to the recommended standard 232 signal transceiver, wherein the control signal conforms to a universal synchronous or asynchronous receiver transmitter communication protocol.

7. The one-to-many communication circuit according to claim 1, further comprising a plurality of subordinate controllers electrically connected to the subordinate controller area network transceiver respectively, wherein each of the plurality of subordinate controllers converts the third signal into a fourth signal conforming to a universal synchronous or asynchronous receiver transmitter communication protocol.

8. The one-to-many communication circuit according to claim 1, wherein the number of the plurality of subordinate controller area network transceivers is less than or equal to 110.

9. The one-to-many communication circuit according to claim 1, wherein at least one of the main controller area network transceiver and the plurality of subordinate controller area network transceivers is a chip with a part number of SN65HVD230.

10. The one-to-many communication circuit according to claim 1, wherein the main controller is electrically connected to the recommended standard 232 signal transceiver, and the main controller is a chip with a part number of MAX3232ESE.

* * * * *